US006126357A

United States Patent [19]

Alkelin et al.

[11] Patent Number: 6,126,357

[45] Date of Patent: Oct. 3, 2000

[54] FRICTION- AND FORM-GRIP CONNECTION OF ROTATING COMPONENTS

[75] Inventors: Harry Alkelin, Finspong; Mikael Fryklund, Umea; Roland Nilsson, Finspong; Per Thörnblad, Norrköping, all of Sweden; Hans Wettstein, Fislisbach, Switzerland

[73] Assignee: Asea Brown Boveri AG, Baden, Switzerland

[21] Appl. No.: 09/106,096

[22] Filed: Jun. 29, 1998

[30] Foreign Application Priority Data

Jul. 3, 1997 [DE] Germany ........................... 197 28 345

[51] Int. Cl.[7] ........................................................ F16B 4/00

[52] U.S. Cl. .............................. 403/28; 403/30; 403/273; 416/244 A

[58] Field of Search ................................ 403/28, 29, 30, 403/335, 336, 338, 273; 416/204 A, 244 A, 239, 220 R, 245

[56] References Cited

U.S. PATENT DOCUMENTS

| | | | |
|---|---|---|---|
| 3,088,758 | 5/1963 | Chilton | 403/28 X |
| 3,713,676 | 1/1973 | Carlstrom et al. | 403/28 |
| 4,242,008 | 12/1980 | Bernasconi | 416/244 A X |
| 4,247,256 | 1/1981 | Maghon . | |
| 4,325,647 | 4/1982 | Maier et al. | 403/29 |
| 4,836,750 | 6/1989 | Modafferi et al. . | |
| 4,859,143 | 8/1989 | Larrabee et al. | 403/30 X |
| 4,986,733 | 1/1991 | Fleury et al. | 416/204 A X |
| 5,056,950 | 10/1991 | Rateick, Jr. et al. | 403/28 X |
| 5,163,816 | 11/1992 | Goetzke et al. . | |
| 5,503,490 | 4/1996 | Melton | 403/30 X |

FOREIGN PATENT DOCUMENTS

| | | |
|---|---|---|
| 0 028 217 | 5/1981 | European Pat. Off. . |
| 36 25 996 | 2/1988 | Germany . |
| 41 41 427 | 6/1993 | Germany . |
| 195 40 745 | 5/1997 | Germany . |

*Primary Examiner*—Harry C. Kim
*Attorney, Agent, or Firm*—Burns, Doane, Swecker & Mathis, L.L.P.

[57] ABSTRACT

In a friction- and form-grip connection of rotating components (1, 2) which have different expansion behavior in the region of the connection during rotation, the form grip is effected via a stepped centering seat (3). The friction grip between the two components is effected by way of axially prestressed elements. At least one of the components has a cavity (6) in the interior, in which cavity (6) an insert ring (7), which exerts a radial force on the centering seat (3) during operation, is arranged. The prestressed insert ring (7) bears with only part of its axial extent against the component (1) interacting with it.

7 Claims, 1 Drawing Sheet

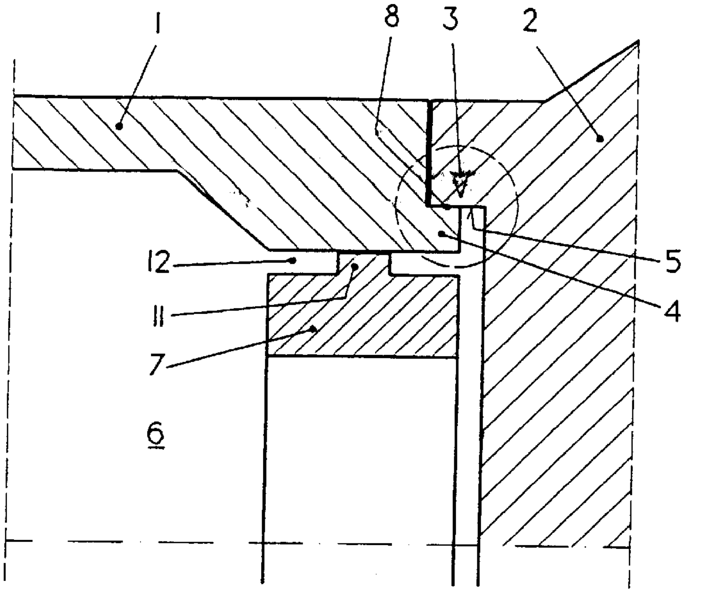
FIG.1
FIG.3
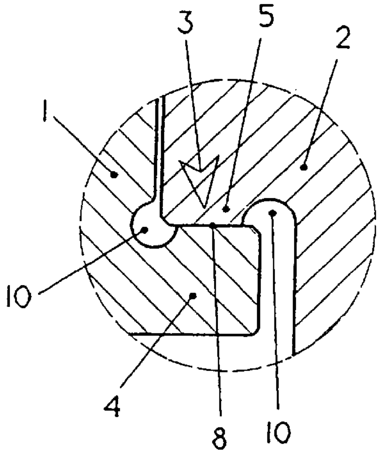
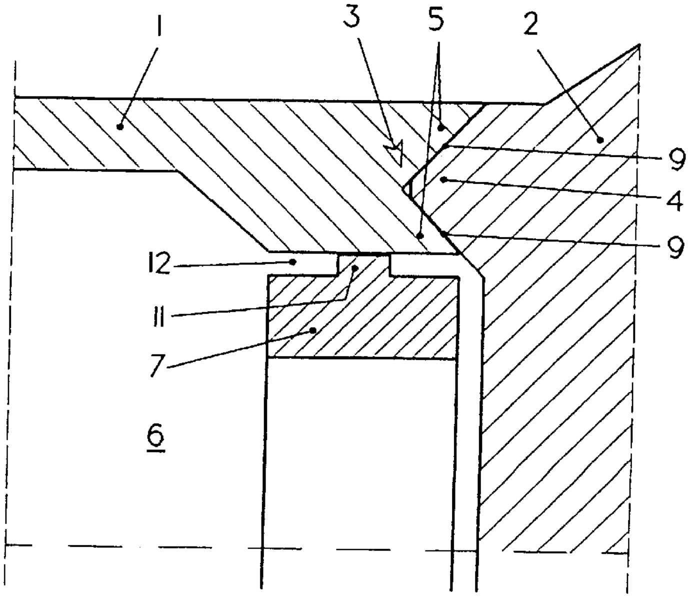
FIG.2

FRICTION- AND FORM-GRIP CONNECTION OF ROTATING COMPONENTS

BACKGROUND OF THE INVENTION

1. Field of the Invention

The invention relates to a friction- and form-grip connection of rotating components.

Such connections are used, for example, for joining together rotor disks of gas turbines subjected to high thermal loading.

2. Discussion of Background

The rotor of a turbomachine generally consists of a plurality of rotor disks, which are lined up axially next to each another and concentrically oriented. These rotor disks are fastened to one another by one or more tie rods and thus form a compact unit. For the operation of a turbomachine, it is necessary that the rotors have very high axial rigidity and centering (true running), i.e. that no unsteady states, vibrations or eccentric running due to displacements in the center of gravity can arise in the various operating states. This despite the unavoidable, different coefficients of thermal expansion of the different materials used. In order to avoid such misalignments of the rotor parts relative to one another, radial serrations may be arranged on the end faces of the rotor disks. The production of the same, however, is very expensive and requires high-precision machines. Other measures, such as short spigots etc. have been unable to prevent, in practice, misalignment of the rotor parts relative to one another and thus untrue running, which may lead to the destruction of rotor and stator.

SUMMARY OF THE INVENTION

Accordingly, one object of the invention, in attempting to avoid all of these disadvantages, is to provide a novel friction- and form-grip connection of rotating components which is designed in such a way or can be retrofitted in such a way that an operationally induced maladjustment (twisting or displacement) of components relative to one another is avoided.

In the case of a connection of the type mentioned at the beginning, this is achieved by the defining features of the patent claim. Further features and advantages follow from the subclaims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings of an application in gas turbines, wherein:

FIG. 1 shows schematic details of two adjacent rotor disks in a first embodiment;

FIG. 2 shows schematic details of two adjacent rotor disks in a second embodiment;

FIG. 3 shows the centering seat from FIG. 1 in an enlarged view.

Only the elements essential for understanding the invention are shown; in particular, that part of the rotor which is unaltered and known per se or other rotor details etc. are not shown.

DESCRIPTION OF THE PREFERRED EMBODIMENTS

Referring now to the drawings, wherein like reference numerals designate identical or corresponding parts throughout the several views, the rotating components 1 and 2 are designated below as rotor disks 1 and 2 respectively. In the case of a rotor for turbomachines, the individual rotor disks 1, 2 are lined up axially next to each other and are concentrically fastened to one another by at least one tie rod (not shown in the figures). The clamping forces caused by the tie rods result in a friction-grip connection of the rotor disks. However, there may be operating states in which these frictional forces originating from the clamping forces are not sufficient in order to prevent a maladjustment of the rotor disks relative to one another. This may be the case, in particular, if the rotor disks have a different expansion behavior during rotation, inter alia because they are made of different materials.

Therefore, according to FIG. 1, in a first embodiment of a rotor, in addition to the friction-grip connection of the adjacent rotor disks, a radially effective form- and friction-grip connection is provided as a means of inhibiting radial axial misalignments. This form- and friction-grip connection is designed as centering seat 3, which is provided between each two rotor disks adjacent to one another and is prestressed by an insert ring 7. In this arrangement, the centering seat on the two adjacent rotor disks has the shape of an encircling, concentric step having a positive, projecting centering offset 4 on the rotor part 1 and a negative, indented centering offset 5 on the rotor part 2.

The insert ring 7 is arranged on the rotor disk 1, which is on the inside relative to the centering seat, specifically in a cavity 6. It is prestressed, which may be effected by heat shrinking during assembly. During rotation, it presses the rotor disk 1, which is on the inside relative to the centering seat 3, against the outer rotor disk 2 as a result of the mass-related centrifugal force and thus produces a form- and friction-grip connection. The positive and negative centering offsets 4, 5 of this centering seat essentially have a cylindrical contact surface 8, which lies concentrically with the rotor axis. A slightly conical orientation of the contact surface 8 is of course also possible. The centering seat prevents a radial displacement, and, due to the contact pressure, an increased resistance against axial displacements of the rotor disks relative to one another is also achieved. Such displacements may be caused by the thermal expansions and the thermal stresses at the high operating temperatures of the gas turbines.

According to FIG. 3, the centering seat 3 is provided with concave undercuts 10 both in front of and behind the contact surface 8. Their rounded portions facing the contact surface end inside the contact surface. With this measure, the mechanical stress characteristic inside the material can be changed in such a way that the zones of maximum mechanical loading, i.e. of the greatest stress gradient, are shifted out of the region of the contact surface 8. At the same time, those zones of the rotor parts 1 or 2 in which tensile stresses which are parallel to the surface and which open cracks and thus promote crack growth may occur under certain operating conditions are removed from the contact region of the other rotor part 1 or 2 in each case, so that no fretting cracks can develop there. Furthermore, the overlapping of the front edge of the undercut of the other rotor part in each case by an extension of the contact surfaces of both rotor parts, which extension exceeds the relative movements and installation tolerances to be expected, achieves the effect that only compressive stresses which are parallel to the surface and which close cracks and thus prevent crack growth occur in the contact region under the certain operating conditions referred to.

In a further embodiment, the mutual centering of the rotor disks can be effected via two conical seats. A double-conical design of the centering seat 3 having a corresponding, double-conically running contact surface 9 is then appropriate. In this case, it is the rotor part 2 which has the positive centering offset 4, whereas the rotor part 1 is provided with the negative centering offset 5. The tolerances here are selected in such a way that in each case one of these conical surfaces is fully loaded during operation, while the offsets of the other conical surface are only partly in contact.

In a preferred embodiment, provision is made for the insert ring 7 to bear against the rotor disk 1 not over the full surface but only with part of its outer surface. This can be achieved by the ring being provided with a collar 11. The collar is dimensioned in its diameter and its axial extent in such a way that it generates a small gap 12 between ring 7 and rotor disk 1 on either side of the collar. The working surface, which is now smaller, produces favorable, reduced heat transfer from the rotor disk to the insert ring.

If it is assumed that the rotor disk 1—in the cavity 6 of which the insert ring 7 is accommodated—is made of a ferritic steel having a lower coefficient of expansion and the rotor disk 2 is made of an austenitic steel having a higher coefficient of expansion, a material having a higher coefficient of expansion is likewise preferably selected as the material for the insert ring 7. In the case of gas turbines subjected to high thermal loading, these material combinations for the rotor disks 1 and 2 are perfectly normal.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A friction- and form-grip connection of rotating components which have different expansion behavior in a region of the connection during rotation, the form grip being effected via a centering seat and the friction grip between the two components being effected by means of axially prestressed elements, at least one of the components having a cavity in the interior, wherein an insert ring, which exerts a radial force on the centering seat during operation, is arranged in the cavity, and wherein one of the components having a negative centering offset and the insert ring are made of a material which has a higher coefficient of expansion than the material of the other component having a positive centering offset, in the cavity of which the insert ring is accommodated.

2. The connection as claimed in claim 1, wherein the insert ring bears with only part of its axial extent against the component interacting with the insert ring.

3. The connection as claimed in claim 1, wherein the insert ring is prestressed.

4. The connection as claimed in claim 3, wherein the insert ring is fitted into the cavity by heat shrinking.

5. The connection as claimed in claim 1, wherein the centering offsets of the centering seat is designed to be at least approximately cylindrical or slightly conical.

6. The connection as claimed in claim 5, wherein the centering seat, both in front of and behind a contact surface between the positive and negative offsets of the centering seat, is provided with concave undercuts, whose rounded portions facing the contact surface end inside the contact surface.

7. The use of the friction-, and form-grip connection as claimed in claim 1 for joining together rotor disks of turbomachines, individual rotor disks arranged concentrically with one another being screwed to one another in the rotor interior by one or more bolts.

* * * * *